United States Patent [19]

Nakai et al.

[11] Patent Number: 4,496,230
[45] Date of Patent: Jan. 29, 1985

[54] EXPOSURE CONTROL DEVICE FOR CAMERAS

[75] Inventors: Masaaki Nakai, Kitakatsuragi; Masayoshi Sahara, Sennan; Hiroshi Hosomizu, Sakai; Tokuji Ishida, Daito, all of Japan

[73] Assignee: Minolta Camera Kabushiki Kaisha, Osaka, Japan

[21] Appl. No.: 395,991

[22] Filed: Jul. 16, 1982

[30] Foreign Application Priority Data

Jul. 17, 1981 [JP] Japan ............................... 56-112812

[51] Int. Cl.³ ............................................. G03B 15/05
[52] U.S. Cl. .................................... 354/416; 354/418; 354/431; 354/441
[58] Field of Search ............................. 354/27, 32–35, 354/60 F, 139, 145, 149, 416–418, 442, 445, 431, 480

[56] References Cited

U.S. PATENT DOCUMENTS 4,153,355  5/1979  Ikawa et al. .................... 354/60 F
4,213,682  7/1980  Yamada ........................... 354/38 X
4,367,023  1/1983  Ishida et al. ...................... 354/35 X Primary Examiner—William B. Perkey
Attorney, Agent, or Firm—Watson, Cole, Grindle & Watson

[57] ABSTRACT

A flash photography system for a camera which is adapted to be used with an electronic flash device which supplies a control signal when the device is a ready condition. The camera includes a diaphragm control circuit which automatically control the diaphragm aperture in accordance with a measurement of the light from the scene to be photographed. The diaphragm control circuit includes a circuit for producing a first program signal for controlling the diaphragm aperture and camera exposure time in a first programmed relationship with the light measurement for daylight or natural light photography, and a circuit for produces a second program signal for controlling the diaphragm aperture in a second programmed relationship with the light measurement for flash photography. The second program signal is adapted to provide a proper exposure for the ambient light condition as well as the flash light illumination.

11 Claims, 7 Drawing Figures

EXPOSURE CONTROL DEVICE FOR CAMERAS

FIELD OF THE INVENTION

The present invention relates to an exposure control device for a camera provided with a focal plane shutter mechanism, and more particularly relates to a diaphragm control device for flash photography with such a camera.

DESCRIPTION OF THE PRIOR ARTS

Nowadays, cameras are systematically associated with or systematized with electronic flash devices (hereinafter referred to as "strobe") to facilitate photography with a strobe. In one of the systems when the main capacitor of a strobe is charged to or above a given level, a charge completion signal which shows that the strobe is ready for firing, is transmitted to the camera. In response to the charge completion signal, the shutter speed is automatically set to a value synchronizable with the flash firing. At the same time, the strobe generates a signal corresponding to a specific diaphragm aperture e.g. F5.6 suitable for flash photography. Then, the exposure control device in the camera controls the diaphragm in response to the signal. Such a flash photography system facilitates flash photography wherein the user may only attach the strobe on to the camera and turn on the power switch of the strobe for obtaining good pictures.

As the flash photography becomes easier, users may wish to use strobe for various photographic scenes. That is, the strobe is desirably used not only for illuminating a dark scene or an object but also for auxiliary illuminating a light object for the purpose of compensating the light condition for the object.

However, as with the prior art flash photography system mentioned above, the diaphragm aperture for flash photography is mainly dependent on the flash light but independent of the ambient light condition. Therefore, it is likely that when a picture is taken of a person in a comparatively light background, the picture may be over-exposed for the background although a proper exposure has been obtained for the person who is in a light condition dominated by the flash illumination. In other words, exposure is unbalanced for such a scene between the main object and a lighter background.

SUMMARY OF THE INVENTION

Accordingly the general object of the present invention is to provide an improved flash photography device which can provide better pictures than the conventional system.

Another object of the present invention is to provide a flash photography system with which compensated exposure is given to the picture of the background or the portion surrounding a main object.

Further object of the present invention is to provide a flash photography system with which exposure is balanced between an main object and its background or surroundings.

Yet another object of the present invention is to provide a camera including an exposure control system which, upon flash photography, can provide balanced exposure for a main object and its background or surroundings.

Still another object is to provide an exposure control system for a camera responsive to a signal from a flash device to determine the diaphragm aperture and the shutter speed such that they provide balanced exposure to the main object and its background or surroundings.

DETAILED DESCRIPTION OF THE EMBODIMENT

Figure 1:
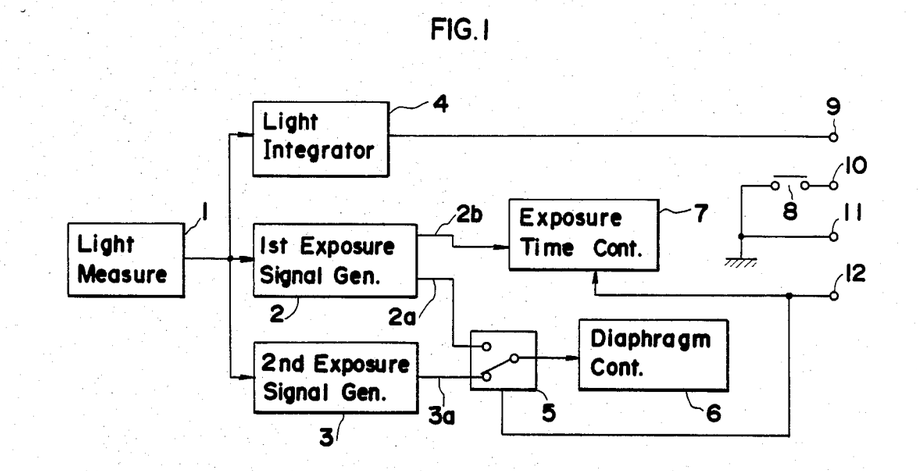
FIG. 1 is a block diagram showing the basic construction of an exposure control device according to the present invention.

With reference to FIG. 1, light measuring circuit 1 generates an electric signal as a function of the scene brightness (brightness of the scene to be photographed) measured through a camera objective and its diaphragm aperture before and during a film exposure. The first exposure signal generating circuit 2 generates an exposure signal for exposure control in a natural or ambient light photography mode. In the case where the circuit of FIG. 1 is adapted for the shutter-speed-priority automatic exposure control, the first exposure signal generating circuit 2 generates at output terminal 2a a signal for the diaphragm control in accordance with a manually set shutter speed and an electric signal from light measuring circuit 1. Examples of such exposure signal generating circuits are disclosed in U.S. Pat. Nos. 3,972,055 and 4,264,159. These disclosures are incorporated herein by reference. At the other terminal 2b a signal commensurate with a manually set shutter speed is generated. In the case where the circuit of FIG. 1 is adapted for the programmed exposure control mode, first exposure signal generating circuit 2 generates at outputs 2a and 2b signals respectively representing a diaphragm aperture and a shutter speed in accordance with the output of light measuring circuit 1. Examples of such exposure signal generating circuits are found, for example, in U.S. Pat. Nos. 4,174,160 and 4,213,683. These disclosures are also incorporated herein by reference. Second exposure signal generating circuit 3 generates a signal which has a predetermined relationship with the electric signal from light measuring circuit 1 and which is used for controlling the diaphragm aperture for flash photography.

Integrating circuit 4 integrates an electric current proportional to the intensity of the scene brightness traversing the camera objective and its diaphragm aperture while the film is being exposed to the scene light. Integrating circuit 4 includes a circuit for supplying a control signal through terminal 9 to a strobe circuit (not shown in this figure) when the integration of the electric current reaches a given level. In response to the control signal, the strobe stops firing. Analog switch 5 transmits the output signal of the second exposure signal generating circuit 3 when receiving, for example, a "High" level signal representing the charge completion of the strobe (charge completion signal) through terminal 12 from the strobe circuit, and transmits the output signal of the first exposure signal generating circuit 2 while receiving no charge completion signal. Diaphragm control circuit 6 controls the diaphragm aperture to a size according to the signal given through analog switch 5.

Exposure time control circuit 7 controls the shutter speed to a value in accordance with the shutter speed signal from the first exposure signal generating circuit when no charge completion signal is applied thereto. When a charge completion signal is applied, exposure time control circuit 7 controls the shutter speed to a value synchronizable with the flash firing in the manner, for example, as shown in U.S. Pat. No. 4,091,396, which disclosure is incorporated herein by reference.

Menawhile, the diaphragm aperture controlled by the diaphragm control circuit does not necessarily correspond exactly to the signal from output terminal 2b of first exposure control circuit 2 due to mechanical delay in the diaphragm control mechanism. Accordingly, exposure error is likely to occur when the shutter speed is controlled in accordance with the signal from output terminal 2a. To cope with this problem, the exposure time control circuit may be constructed so that it controls the shutter speed in accordance with the measurement of the scene light passing through the diaphragm aperture having been determined by diaphragm control circuit 6, rather than in accordance with the signal from output terminal 2a of the first exposure signal generating circuit.

When the exposure control device, as mentioned above, is actuated, for example, by depression of a shutter release button when a charge completion signal is being applied from the strobe, diaphragm control circuit 6 controls the diaphragm aperture in accordance with the signal from the second exposure signal generating circuit. Then, exposure time control circuit 7 controls the shutter speed to the flash synchronized value. When the shutter is fully opened, synchro switch 8 is closed to trigger the firing of the flash tube in the strobe. At this time, integrating circuit 4 monitors the amount of the scene light incident on the film and supplies a control signal to the strobe for terminating the flash firing when the monitored amount, represented by a voltage corresponding to the integration of the current commensurate with the scene brightness intensity, reaches a given level. Thus, when the strobe reaches the condition of charge completion, both the diaphragm aperture and the shutter speed are switched to values suitable for flash photography. The diaphragm aperture is controlled by the output signal of second exposure signal generating circuit 2 to a value for which the brightness of the scene around the main object is taken into account.

It is to be understood that the definite circuit construction for the blocks in FIG. 1 may have various forms.

For example, diaphragm control circuit 6 may be of the full-aperture light measuring type wherein the diaphragm aperture is controlled in accordance with the light measurement obtained while the diaphragm aperture is fully open, with the light measurement being stored before actuating the diaphragm. Otherwise, the diaphragm control circuit may be of the diaphragm stop-down type wherein the scene brightness is measured through the stopped-down diaphragm aperture while the diaphragm mechanism is arrested to determine its aperture when the light measurement reaches a predetermined level. Further, the signal for switching the exposure control circuit to the flash photography mode need not necessarily be the charge completion signal, but may be a signal which is supplied by the strobe when its power source is turned on.

Figure 2:
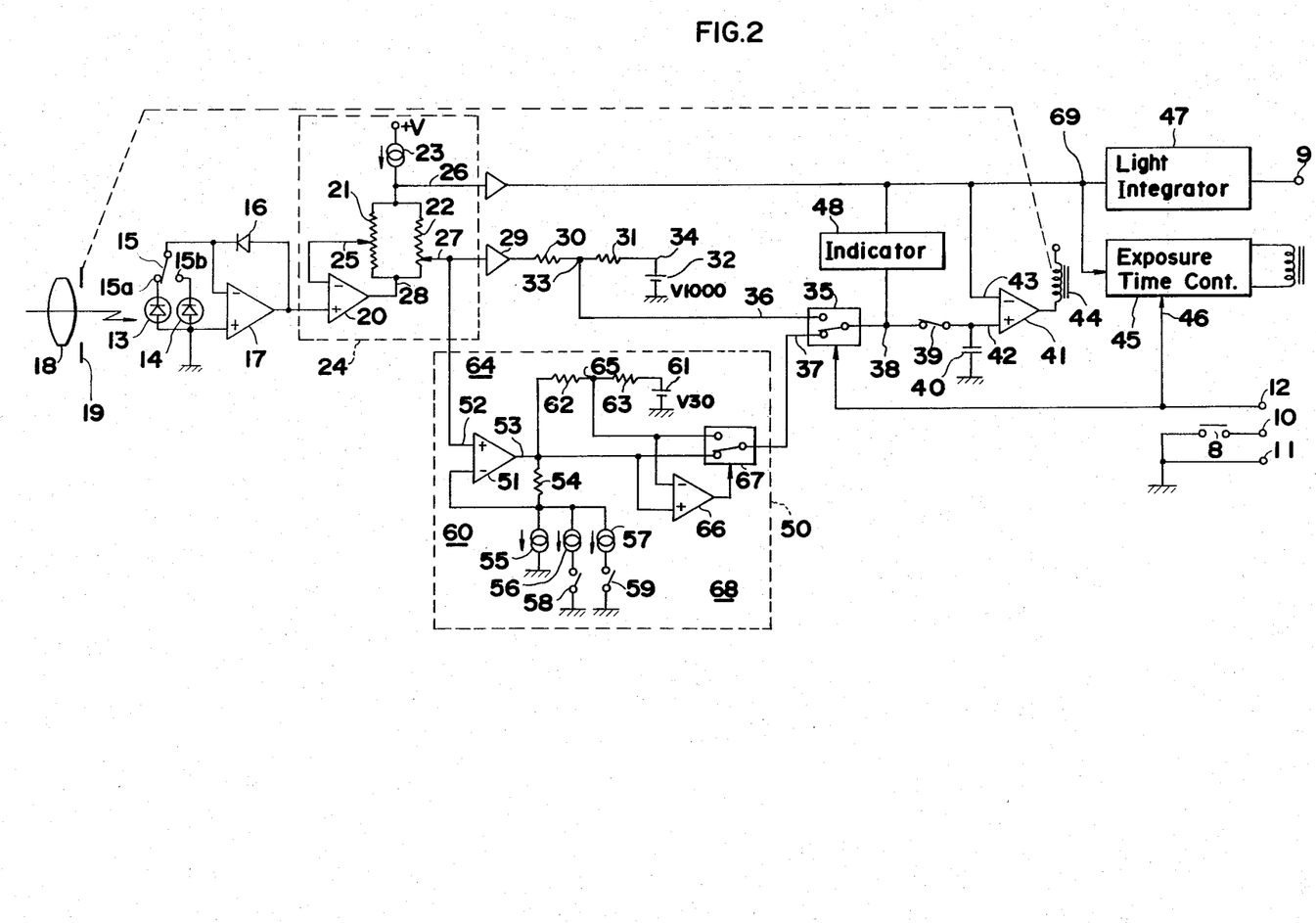
FIG. 2 is a circuit diagram showing an embodiment of the present invention.

FIG. 2 shows an embodiment of the present invention which is adapted for a single lens reflex camera. The exposure control circuitry of FIG. 2 employs the diaphragm control device of the diaphragm stop-down type and a programmed exposure control which, in the natural light photography mode, controls both the diaphragm aperture and the shutter speed in accordance with the brightness of the scene to be photographed. It will be apparent to those skilled in the art that the exposure control circuitry may further include a circuit for the manual exposure control mode wherein both the diaphragm aperture and the shutter speed are controlled in accordance with manual settings. It may further include a circuit for the shutter speed priority automatic exposure control mode and/or the diaphragm aperture priority automatic exposure control mode.

Figure 5:
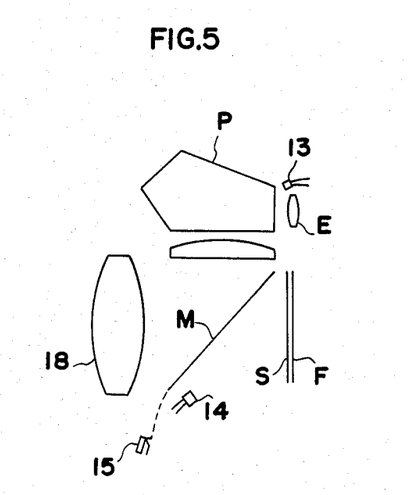
FIG. 5 is a schematic illustration of an optical arrangement of a single lens reflex camera showing an example of the disposition of light detecting elements.

Photodiodes (13) and (14) are disposed in the camera to receive the light from a scene to be photographed, through the camera objective and the diaphragm aperture. In more detail, with reference to FIG. 5, photodiode 13 is located, for example, beside or above the viewfinder eyepiece F, in order to see the scene image on the focusing plate and to measure the scene brightness before reflex mirror M is removed from the view position shown in FIG. 5 to a photographic position outside of the photographing light path. Photodiode 14 is located, for example, at the bottom of the camera body to receive, after the removal of the reflex mirror, the light of the scene to be photographed. The light of the scene passes through the objective 18 and is reflected by the plane of film F being exposed, and the portion of the leading shutter curtain S covering the film. Photodiodes 13 and 14 are selectively connected to the inverting input of operational amplifier 17 through change-over switch 15 which is switched from terminal 15a to 15b in response to the movement of mirror M from the viewing position. Diode 16 is connected to the feedback circuit of operational amplifier 17 so that the output of operational amplifier 17 is proportional to the logarithm of the light intensity incident on either of photodiodes 13 and 14. Thus, photodiodes 13 and 14, switch 15, diode 16 and amplifier 17 together constitute a light measuring circuit generating a signal proportional to the logarithm of the scene brightness measured through the diaphragm aperture.

Exposure calculation circuit 24 includes operational amplifier 20, potentiometers 21 and 22 and constant current source 23. Slider 25 of potentiometer 21 can slide in accordance with the adjustment of a film sensitivity setting dial (not shown), so that exposure calculation circuit 24 generates, at its first output terminal 26 a voltage signal as a function of the measured scene brightness, the actual diaphragm aperture and the set film sensitivity. Slider 27 of potentiometer 22 is linked with a diaphragm value presetting member on the objective lens barrel and is slidable from terminal 26 to terminal 28 for a distance corresponding to the step difference from the full to the preset diaphragm aperture value. Slider 27 serves as the second output terminal of exposure claculation circuit 24. When diaphragm 19 is fully open, exposure calculation circuit 24 generates at the second output terminal a voltage signal as a function of the measured scene brightness, the set film sensitivity and the present diaphragm aperture value. It should be understood that the diaphragm value presetting member should be set to the minimum aperture, i.e., the maximum f-number position for the natural light automatic exposure control mode and the flash photography mode. With this setting, the voltage signal from slider 27 represents a shutter speed suitable for the measured scene brightness, the set film sensitivity and the minimum diaphragm aperture. The voltage signal is used for producing a diaphragm control signal for the programmed exposure control mode and the flash photography mode.

Buffer circuit 29, resistors 30 and 31 and constant voltage source 32 together constitute a first program signal generating circuit which generates at node 33 a diaphragm control signal for the programmed exposure control. Constant voltage source 32 generates voltage signal V1000 corresponding to the highest shutter speed, e.g. 1/1000 second, available in the camera.

Figure 3:
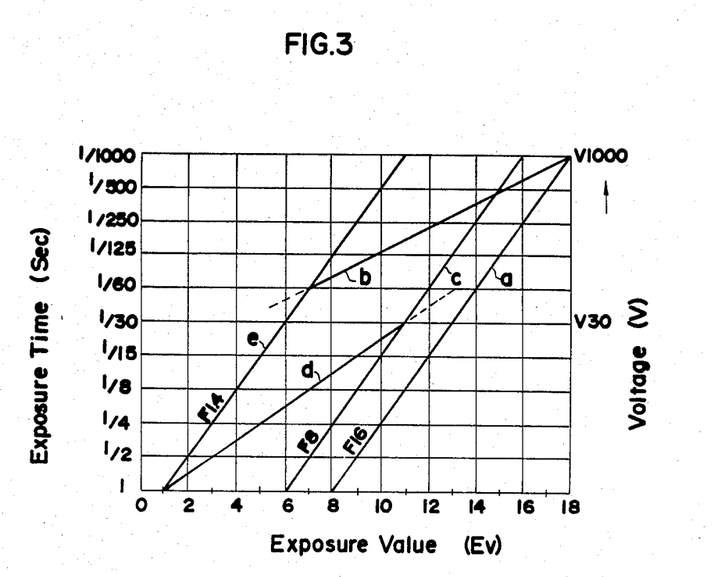
FIG. 3 is a diagram showing the characteristics of the exposure programs carried out by the circuit shown in FIG. 2.

An explanation will be given with reference to FIG. 3 about the relationship between the voltage at node 33 and exposure value EV when the ratio of the resistance of resistors 30 and 31 is 7:4. Assuming that the minimum diaphragm aperture of the objective lens being used is F16 and that the diaphragm value presetting member is set to the position of the minimum diaphragm aperture value, exposure calculation circuit 24 generates at second output terminal 27 an output voltage showing a characteristic represented by straight line a in FIG. 3. When the range of exposure value EV is less than 18, the voltage signal for F16 represented by straight line a is always lower than output voltage V1000 of constant voltage source V1000. If the line segment formed by the voltage signal line a and the horizontal line of output voltage V1000 is divided in a ratio of the resistances of resistors 30 and 31, straight line b is obtained. Straight line b represents the sum of the voltage at the output of buffer 29 and the voltage across resistor 30 as a fraction of the voltage difference between the terminals 27 and 34. The voltage signal generated from node 33 is hereinafter referred to as a first program signal. From the graph of FIG. 3, it will be seen that for the exposure value EV of 7, the diaphragm aperture is F1.4 and the shutter speed is 1/60 second. In the case of an objective lens having the full aperture value of F1.4, the diaphragm aperture remains at the value of F1.4 for the range of exposure value less than 7 with the shutter speed being changed along line e for providing proper exposure, because the diaphragm aperture cannot be changed further along the extension of line b. This is partly shown by a broken line.

Figure 4:
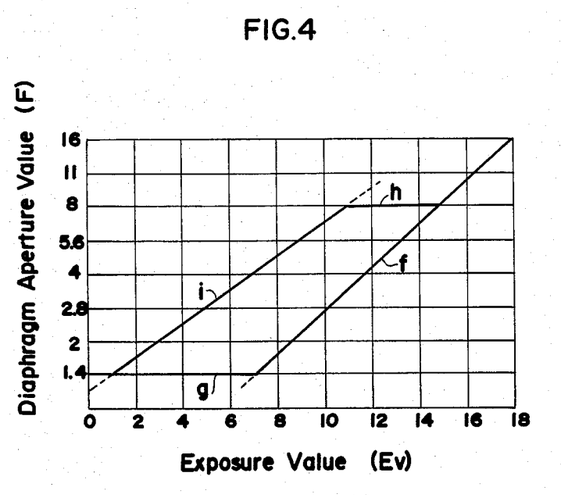
FIG. 4 is a diagram showing, with respect to the relationship with the exposure value, the change of the diaphragm aperture controlled by the circuit of FIG. 2.

The first program signal thus produced at the node 33 is transmitted through change-over switch 35 and storage switch 39 to storage capacitor 40. When the shutter release operation is effected, storage switch 39 is opened immediately before the commencement of the diaphragm stop-down operation, to store the first program signal in capacitor 40. Then, diaphragm 19 is stopped down by a diaphragm drive mechanism (not shown) with the output voltage at first output terminal 26 of exposure calculation circuit decreasing therewith. Comparator circuit 41 compares the output voltage from terminal 26 with the first program signal in storage capacitor 40 and inverts its output to de-energize electromagnet 44 and interrupt the stopping-down of the diaphragm when the signals being compared reach a predetermined relationship, e.g. the signals become equal. Thus, the diaphragm aperture is determined. Diaphragm 19 is stopped down to the minimum aperture of F16 for the exposure value EV of 18, while the diaphragm aperture increases by 7/11 steps as exposure value EV changes by one step. Thus, for the exposure value EV of 7 which is lower by 11 steps than EV 18, the aperture of diaphragm 19 is determined to F1.4 which is enlarged by 7 steps from F16. FIG. 4 shows by lines f and g the relationship between the exposure value and the diaphragm aperture controlled as mentioned above.

After the aperture of diaphragam 19 has been determined, the actual shutter speed is controlled in accordance with the intensity of the scene light passing through the determined diaphragm aperture. In the meantime, the shutter speed may be controlled in accordance with the signal stored in capacitor 42. However, the diaphragm aperture is not necessarily controlled to the value exactly coincident with the value specified beforehand by the first program signal, due to the mechanical delay in the diaphragm control mechanism and other reasons. Hence, the exposure error is likely to occur if the shutter speed is controlled in accordance with the signal from storage capacitor 40. Thus, exposure time control circuit 45 of the present embodiment is connected with first output terminal 26 of exposure calculation circuit 24, which is supplied with the light measurement signal that does not include information about the preset diaphragm aperture value. For exposure time control circuit 46, two types of circuits may be employed. One is of the type wherein the shutter speed is controlled in accordance with the light measurement signal obtained by the measurement of the scene brightness through the diaphragm aperture and stored by another storage capacity immediately after the aperture has been determined. The other is of the type wherein the shutter speed is controlled in accordance with the measurement of the scene light that is reflected by the film surface being exposed and the surface of the leading shutter curtain specially finished to have the light reflective characteristics the same as that of the film surface. In the latter case, the scene brightness is measured and integrated during the film exposure when the reflex mirror has been retracted from the photographic light path with the diaphragm aperture having been determined. When the integration reaches a given level, the shutter is closed. Exposure time control circuit 45 controls the shutter speed to a flash synchronizable value when a charge completion signal is applied to terminal 46 from the strobe.

Next, an explanation will be given about the exposure control circuit for effecting the flash photography mode of the exposure control in response to the charge completion signal being applied from the strobe. In this case, storage capacitor 40 receives, in place of the aforementioned first program signal, a second program signal produced by second program generating circuit 50 whereby the diaphragm aperture is determined in accordance with the stored signal substantially in the same manner as in the natural light photography mode. Second program signal generating circuit 50 includes operational amplifier 50; resistor 54; level shift circuit 60 comprising three constant current sources 55, 56 and 57 and two switches 58 and 59; voltage divider 64 comprising constant voltage source 61 and two resistors 62 and 63; and signal selecting circuit 68 comprising voltage comparator 66 and analog switch 68. Level shift circuit 60 is arranged to generate a voltage signal corresponding to the shutter speed suitable for the diaphragm aperture of F8 independently of which one of minimum aperture values F16·F22 and F32 the objective lens has. Operational amplifier 51 generates a voltage raised by the amount of voltage drop across resistor 54 from the voltage applied to input terminal 52 thereof. When an objective lens with the minimum diaphragm aperture of F16 is coupled to the camera including the embodiment circuit, both switches 58 and 59 are open whereas only the constant current source 55 supplies constant current to resistor 54. The resistance of resistor 54 and the current of constant current source 55 are selected to cause a voltage drop, in that case, across resistor 54 that corresponds to the variation of the voltage at terminal 27 for two steps of exposure value. Thus, level shift circuit 60 generates an output voltage that is higher than the voltage at terminal 27 by a voltage corresponding to two steps. In other words, the output voltage of level shift circuit 60 equal to the voltage at terminal 27 at the time when the slider 27 is set to F8 position that is smaller (i.e. larger in diaphragm aperture size) by two steps than F16. The output voltage of level shift circuit 60 is shown by straight line c in FIG. 3. When an objective with the maximum f-number of F22 or F32 is coupled with the camera, further current or currents are added to the current running through resistor 54 so that the output of level shift circuit 60 shows the characteristics shown also by line c. In the case of an objective with the maximum f-number of F22, switch 58 is closed so that the current of both constant current sources 55 and 56 are supplied to resistor 54 to cause a voltage drop thereacross that corresponds to the variation of the voltage at terminal 27 for three steps. Accordingly, the output of level shift circuit is equal to the voltage at terminal 27 at the time when slider 27 is set to the position of F8 which is three steps smaller in f-number than F22. In the case of an objective lens with the maximum f-number of F32, switches 58 and 59 are closed to supply the currents of constant current sources 55, 56 and 58 to resistor 54 to cause a voltage drop thereacross corresponding to the voltage variation at terminal 27 for four steps, whereby the output of level shift circuit 60 shows the characteristics shown by line c. It is to be understood that the switches 58 and 59 may be operated, for example, in substantially the same manner as switch 15 shown in FIG. 7 of U.S. Pat. No. 4,150,889 which disclosure is incorporated herein by reference.

Voltage divider 64 consisting of resistors 62 and 63 produces a signal which will be described hereinafter. The ratio of resistors 62 and 63 is determined at, for example, 5:4, with constant voltage 61 being arranged to generate voltage V30 which corresponds to the shutter speed of 1/30 second. With these settings, voltage divider 64 divides the voltage shown by straight line c and constant voltage V30 corresponding to the shutter speed of 1/30 second and generates a voltage shown by straight line d. Straight line d is the division of the segment formed by line a and the horizontal line for V30 in the ratio of the resistances for resistors 62 and 63.

In the flash photography mode, the second program signal for the diaphragm control is the voltage shown by line c for the range of the exposure value larger than 11 and is the voltage shown by line d for the range of the exposure value equal to and less than 11. Signal selecting circuit 68 selects from the voltages shown by lines c and d, the voltage higher than the other. Second program signal generating circuit 50 is arranged and operates as described above for the diaphragm control in the flash photography mode in the program as shown by line h and i in FIG. 4.

Upon the operation of the flash photography mode, a charge completion signal applied through terminal 12 from the strobe switches analog change-over switch 35 to select the second program signal. The second program signal is then transmitted to and stored in storage capacitor 40 and is used for the diaphragm aperture control in place of the first program signal. At this time, the shutter speed is controlled to a flash synchronizable value in response to the charge completion signal. On the other hand, integrating circuit 47 integrates the current proportional to the intensity of the light reflected from the film surface being exposed, and generates a control signal when the integration reaches a predetermined level. The control signal is transmitted through terminal 9 to the storobe to interrupt the flash firing. Thus, flash photography is effected with a diaphragm aperture relaying on the ambient light.

As the amount of the flash light emitted from the strobe is controlled in accordance with the monitoring of the scene brightness passing through the camera objective and the diaphragm aperture, no problem will occur by the change of the diaphragm aperture with the charnge of the ambient light. For effective exposure balancing in the picture of a scene wherein the background is lighter than the main object, photodiode 13 for diaphragm control should have a comparatively wide light acceptance angle while photodiode 14 should have comparatively narrow light acceptance angle. Indication device 48 indicates anticipated diaphragm aperture value in both natural light and flash photography modes, in accordance with the output signals generated at terminals 26 and 38 prior to the shutter release operation, as well as a signal representing the fully open aperture value of the objective. The minimum diaphragm aperture for the flash photography mode, which was F8 in the above embodiment, may be determined depending on the extent to which the emitted strobe light is used. If the strobe having a large capacity for the emitted light is selected, the minimum diaphragm aperture may be F11. It is to be understood that the second program signal need not necessarily have the value of the embodiment, but may be modified.

Figure 6:
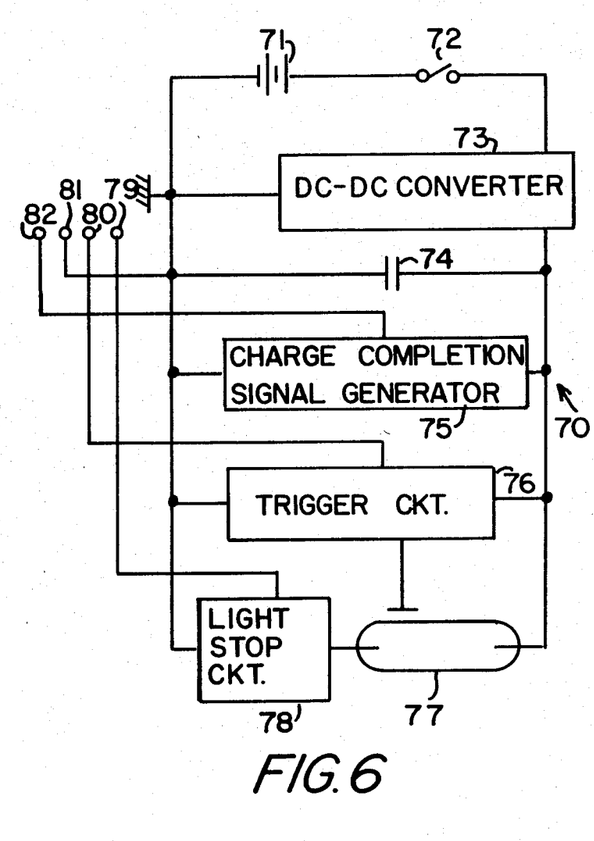
FIG. 6 is a schematic circuit diagram showing a strobe circuit to be coupled with the circuit of FIG. 2.

FIG. 6 shows the circuit of an exemplary stobe to be coupled or associated with the above described exposure control device. With the circuit of FIG. 6, when power switch 72 is turned on, voltage booster circuit 73 of a well-known conventional type is activated to covert the low voltage of battery 71 to a high voltage, e.g. 300 V, with which main capacitor 74 is charged. When main capacitor 74 is charged above a predetermined level, charge completion signal generator circuit 75 generates a "high" voltage signal at terminal 82. When syncho switch 8 in the camera is closed to ground terminal 80, trigger circuit 76 is activated to trigger flash tube 77. Upon receiving a "high" level voltage through terminal 79 from the camera circuit, light termination circuit 78 is made non-conductive to block the discharge current through flash tube 77 thereby terminating the firing of flash tube 77. Terminals 79, 80, 81 and 82 are adapted to be connected respectively with terminals 9, 10, 11 and 12 of the camera.

The camera exposure control device and the strobe assembly as described above may be modified such that the strobe includes integration circuit 4 with the output signal of light measuring circuit in the camera being transmitted to the integration circuit 4 in the strobe, since integration circuit 4 in FIGS. 1 and 2 is used for the control of the flash duration only. Further, in the above described embodiment, the camera exposure control is adapted to switch to the flash photography mode in response to a charge completion signal which is produced when the main capacitor 70 of the strobe is charged above a predetermined level. Instead, the assembly may be arranged to switch the exposure control in conjunction with, for example, turn-on of a strobe power switch independently of the charge condition of the main capacitor.

Figure 7:
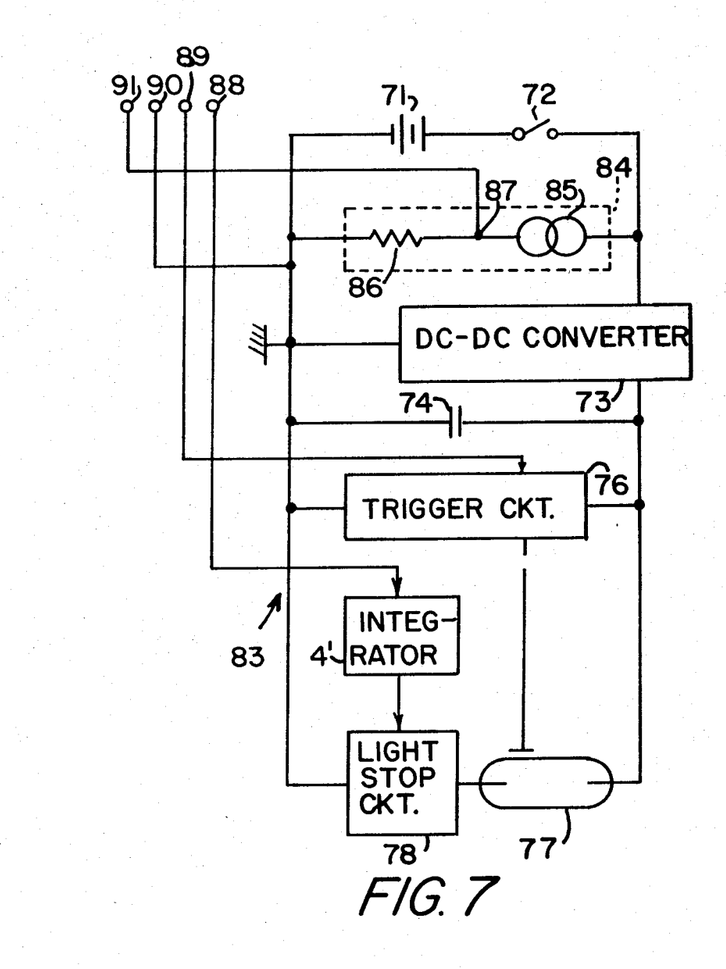
FIG. 7 is a schematic circuit diaphragm showing a modification of the circuit shown in FIG. 6.

An exemplary strobe circuit modified as mentioned above is shown in FIG. 7 wherein the same reference numerals are used for the elements having the same functions as those of their corresponding elements in FIG. 6. With reference to FIG. 7, signal generator circuit 84 includes series connected constant current source 85 and resistor 86 and generates, in response to the closure of power switch 72, at junction 87 a voltage output of a given level which is to be used in place of the charge completion signal. Integration circuit 4' corresponds to integrating circuit 4 of FIG. 2. Simultaneously with the start of the firing of flash tube 77, integration circuit starts integration of the current commensurate with the voltage applied to terminal 88 through junction 69 (see FIG. 2) from light measuring circuit 24 of the camera. When the value of the integration reaches a predetermined level, integration circuit produces a "high" level voltage signal. It is to be noted that the circuit for commensing the integration in synchronization with the initiation of the flash firing may have an arrangement or structure as is employed in a conventional automatic flash device which controls its flash duration in accordance with a light measurement presented by a light detector provided thereon.

In the flash photography system employing the strobe with the circuit of FIG. 7, the integration circuit for integrating the current commensurate with the light being detected, is provided in the strobe and junction 69 in FIG. 2 may be directly connected with output terminal 9 whereby terminal 88 of the strobe is connected through terminal 9 to junction 69.

What is claimed is:
1. An exposure control system for a camera adapted to be coupled with an electronic flash device which supplies a control signal to the camera representing a ready condition of the device, said system comprising:
 a light measuring means including a first photoelectric member for receiving light of a scene to be photographed, through a camera objective lens and the diaphragm aperture, and generating a first photoelectric signal as a function of the intensity of the received light;
 a first programed signal means for generating a first exposure control signal which changes with said first photoelectric signal according to a first program for natural light photography;
 a second programed signal means for generating a second exposure control signal changing in dependence on said first photoelectric signal obtained before actuation of the diaphragm without illumination of said scene by flash light and according to a second program for flash photography;
 a diaphragm control means for controlling said diaphragm aperture in accordance with either said first or second exposure control signal;
 a first switch means for connecting said diaphragm control means normally with said first programed signal means and with said second programed signal means in response to said control signal;
 an exposure time control means for controlling camera exposure time in accordance with the photoelectric signal which is generated with said photoelectric member receiving the light through the diaphragm aperture determined by said diaphragm control means in accordance with the first exposure control signal; and
 means responsive to said control signal for switching said exposure time control means to a condition for providing a predetermined exposure time suitable for flash photography.

2. An exposure control system as set forth in claim 1 wherein said light measuring means further includes a second photoelectric member for receiving the light of the scene that was reflected by a surface of a film in the camera, and generating a second photoelectric signal as a function of the intensity of the received light, and said system further comprises a integration means for integrating said second photoelectric signal and generating a stop signal in response to the integration, said stop signal being supplied to the electronic flash for stopping its firing.

3. An exposure control system as set forth in claim 2 wherein said light measuring means includes third shifting means for shifting said first photoelectric signal in accordance with a set film sensitivity and generating a third shifted signal representative of a first exposure time as a function of said scene light, said film sensitivity and the measure of the diaphragm aperture through which said first photoelectric member receives the scene light, said first shifting means is coupled with said third shifting means such that said first shifted signal corresponds to a second exposure time as a function of said third shifted signal and said preset diaphragm aperture value, said first programed signal means includes a first reference means for generating a first reference signal, and means for producing said first exposure signal from said first shifted signal and said first reference signal, and said diaphragm control means includes a comparator means for storing said first exposure control signal prior to actuation of the diaphragm and a comparator means for comparing said third shifted signal with the stored first exposure control signal.

4. An exposure control system as set forth in claim 1 wherein said light measuring means includes a first shifting means for shifting the level of said first photoelectric signal in accordance with a present diaphragm aperture value and generating a first shifted signal, said first programed signal means includes means for producing said first exposure control signal in accordance with said first shifted signal, said second programed signal means includes means for shifting said first shifted signal to a second shifted signal which provides a predetermined diaphragm aperture, and means for producing said second exposure control signal in accordance with said second shifted signal.

5. An exposure control means as set forth in claim 4 wherein said second program means includes a second reference means for generating a second reference signal, means for generating an intermediate signal having a level between the levels of said second shifted signal and said second reference signal with the ratio of the differences between the intermediate level and both end levels being fixed, a second comparator means for comparing said intermediate signal with and second shifted signal and, a first selection means for selecting one of said intermediate signal and said second shifted signal in accordance with the comparison therebetween, and said first switch means includes a second selection means for selectively transmitting said first exposure control signal and said selected one of said intermediate signal and said second shifted signal whereby said first comparator compares said third shifted signal with said selected one signal in place of said first exposure control signal when said control signal of the electronic flash device is received.

6. An exposure control system as set forth in claim 1 wherein said integration means is included in the electronic flash device.

7. An exposure control system as set forth in claim 1 wherein said integration means is included in a camera.

8. An exposure control system as set forth in claim 1 wherein said exposure control means in coupled with said second photoelectric member to control the exposure time in accordance with said second photoelectric signal.

9. A flash photography system comprising:
- an electronic flash means including a flash tube, means for energizing said flash tube for light emission, and means for generating a control signal representing a ready condition of the electronic flash means;
- an exposure time control means responsive to said control signal for controlling the camera exposure time to a value proper for flash photography;
- a light measuring means for measuring light from a scene to be photographed and generating a light measurement signal as a function of the measured light;
- a first exposure signal means for generating a first exposure signal which changes as a function of the light measurement signal obtained without flash light illumination of the scene, said first exposure signal changing in accordance with a first programmed characteristic being such that the diaphragm aperture controlled in accordance with said first exposure signal is constant while the light measurement signal is larger than a given level, but increases with the decrease of the light measurement signal when the latter is less than said given level;
- a diaphragm control means for controlling the camera objective diaphragm in accordance with said first exposure signal;
- flash control means for controlling the duration of the flash firing in accordance with the controlled diaphragm aperture and light emitted from said flash tube and reflected from said scene to be photographed; and
- a second exposure signal means responsive to said light measurement signal for generating a second exposure signal for controlling the diaphragm aperture to a value to provide a proper exposure in natural light in cooperation with other exposure parameters, means for selectively connecting said first and second exposure signal means with said diaphragm control means in dependence on whether said control signal is generated or not.

10. A flash photogaphy system as set forth in claim 9 wherein said second exposure signal means includes an exposure time signal means for generating an exposure time control signal commensurate with a manually set exposure time, said exposure time control signal being supplied to said exposure time control means, and means for generating a diaphragm control signal as said second exposure signal that will provide a diaphragm aperture suitable for the measured light and said manually set exposure time.

11. A flash photography system as set forth in claim 9 wherein said second exposure signal means includes means for generating a second diaphragm control signal which changes as a function of said light measurement signal in accordance with a second programed characteristic designed for natural light photography, and said exposure time control means includes means for controlling exposure time in accordance with the light from the scene and the diaphragm aperture determined in accordance with the second diaphragm control signal.

* * * * *